United States Patent [19]
Ishikawa

[11] 3,746,135
[45] July 17, 1973

[54] CLUTCH AND BRAKE INCHING CONTROL

[75] Inventor: Kazuo Ishikawa, Kariya city, Aichi Pref., Japan

[73] Assignee: Aisin Seiki Kabushiki Kaisha, Kariya City, Japan

[22] Filed: Dec. 16, 1971

[21] Appl. No.: 208,680

[30] Foreign Application Priority Data
Dec. 16, 1970 Japan.............................. 45/126548

[52] U.S. Cl............. 192/4 A, 192/109 F, 192/13 R, 60/54.5, 137/625.69
[51] Int. Cl.......................................... F16d 67/04
[58] Field of Search................... 192/4 A, 4 C, 13 R

[56] References Cited
UNITED STATES PATENTS

| | | | |
|---|---|---|---|
| 3,313,383 | 4/1967 | Tendresse........................... | 192/4 A |
| 3,631,948 | 1/1972 | Ishikawa............................. | 192/4 C |
| 2,285,557 | 6/1942 | Berglund...................... | 192/13 R X |
| 2,950,734 | 8/1960 | Hasbany....................... | 192/13 R X |
| 3,321,055 | 5/1967 | Randol............................. | 192/13 R |
| 3,381,783 | 5/1968 | Brukner............................. | 192/4 C |

*Primary Examiner*—Benjamin W. Wyche
*Attorney*—Oblon, Fisher & Spivak

[57] ABSTRACT

A transmission control system for a vehicle having a fluid actuated clutch means and hydraulic brake means, comprising, a source of fluid pressure, a first fluid conduit for delivering fluid pressure being discharged from the source to the clutch means, a fluid pressure control valve means disposed within the first fluid conduit for automatically controlling the fluid pressure being discharged from the source and for communicating the controlled fluid pressure with the clutch means, a fluid actuated inching valve means disposed within the first fluid conduit for activating and de-activating the clutch means, and a tandem master cylinder fluidically connected to the brake means, the tandem master cylinder including a first fluid chamber connected to the brake means through a second fluid conduit and a second fluid chamber connected to the inching valve means through a third fluid conduit, whereby even when the third fluid conduit for communicating the inching valve means with the second fluid chamber of the tandem master cylinder is damaged, the same braking force may be obtained as well as the braking force obtained normally by the depression of a brake pedal.

5 Claims, 2 Drawing Figures

Patented July 17, 1973

INVENTOR.
KAZUO ISHIKAWA
BY
Oblon, Fisher and Spivak

3,746,135

CLUTCH AND BRAKE INCHING CONTROL

BACKGROUND OF THE INVENTION

This invention relates generally to improvements in an automatic transmission control system of a vehicle, and more particularly to a hydraulic control system for such as vehicle of the type being provided with a fluid actuated clutch means and a brake system for arresting movement of the vehicle.

It is frequently required in the operation of an industrial vehicle, such as a forklift truck, provided with a torque convertor and the like, that an inching valve means be operated in accordance with the depressing force of a brake pedal and that a clutch means be disengaged before the brake is applied, when the brake pedal is depressed.

To meet this need, there has been introduced such a vehicle being provided with allinking mechanism connected to the brake pedal or a method for using the fluid pressure of the brake circuit for operating the inching valve means. However, when using the linking mechanism, the idle stroke of the brake pedal becomes so large that the feeling of the brake upon depressing the brake pedal is not good and additionally the arrangement or disposition of the linking mechanism is somewhat limited by other devices of the vehicle. Also, the operation of the linking mechanism is often ineffective to provide the necessary smooth operation required thereof. Another problem is that upon using the fluid pressure of the brake circuit, since the same fluid pressure is supplied both to the brake system and the inching valve means, brake pressure is not applied when hydraulic failure occurs in the fluid circuit. These deficiencies are considered to be greatly disadvantageous in practice.

SUMMARY OF THE INVENTION

It is, therefore, an object of the present invention to provide an improved transmission control system adapted for obviating the aforementioned drawbacks of conventional control systems.

It is another object of the present invention to provide an improved transmission control system capable of using a tandem master cylinder for obviating the aforementioned drawbacks of conventional systems.

It is still another object of the present invention to provide an improved transmission control system capable of obtaining the same braking force as that normally obtained by the depression of a brake pedal even in the case of a hydraulic failure.

It is a further object of the present invention to provide an improved transmission control system having the aforementioned characteristics, wherein the brake is applied after the disengagement of a fluid actuated clutch means, by changing the outstanding characteristics of two springs arranged within the tandem master cylinder.

It is yet a further object of the present invention to provide an improved transmission control system having the aforementioned characteristics, wherein the feeling of the brake upon depressing the brake pedal is extremely good and smooth operation of the brake pedal is attained.

BRIEF DESCRIPTION OF THE DRAWING

Various other objects, features and attendant advantages of this invention will be more fully appreciated as the same becomes better understood from the following detailed description when considered in connection with the accompanying drawings, in which.

DETAILED DESCRIPTION OF THE INVENTION

Figure 1:
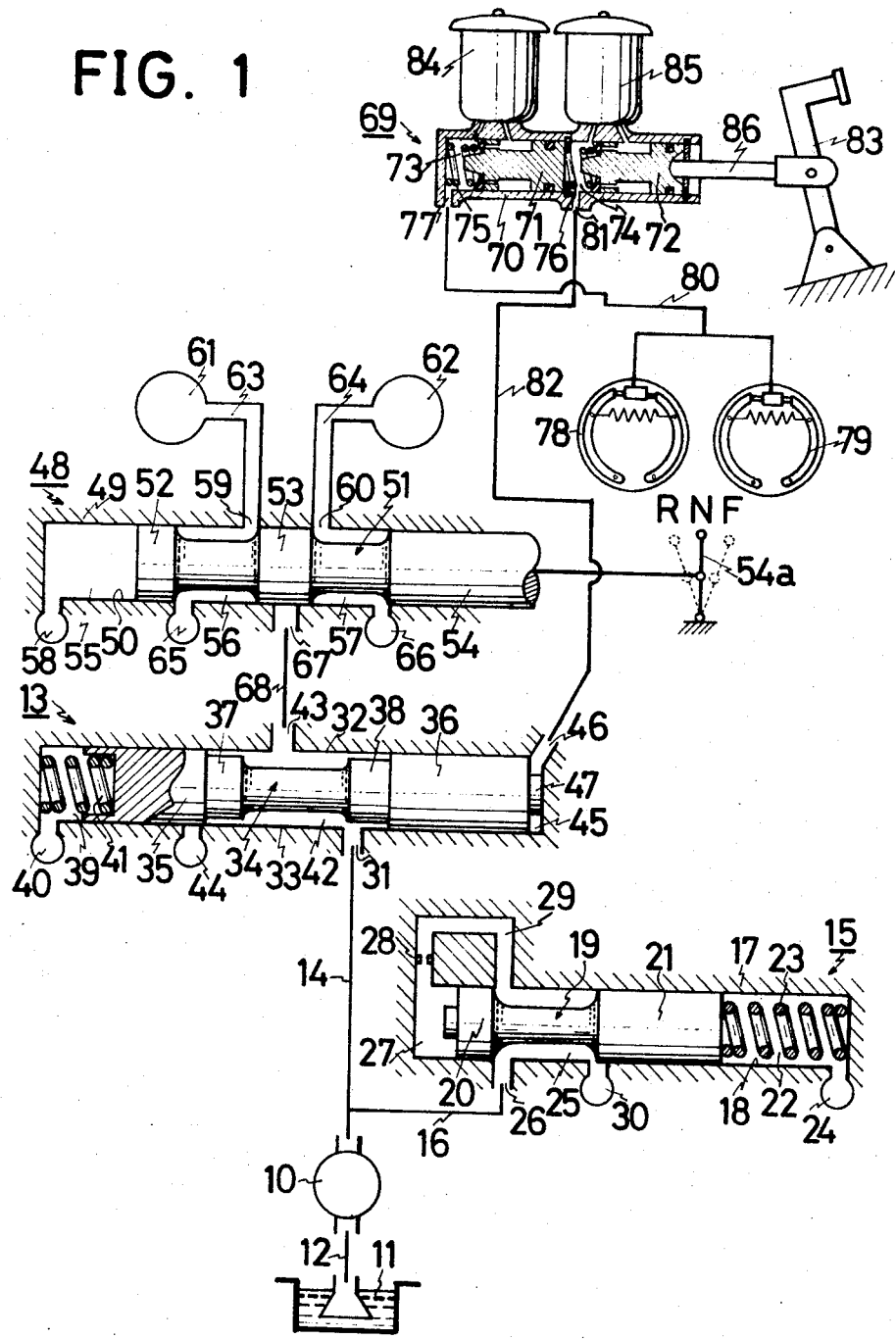
FIG. 1 is a diagrammatic view, with parts in vertical cross-section, of one embodiment of the fluid control system constructed according to the present invention.

Referring now to the drawings, the numeral 10 denotes a hydraulic pressure pump being driven by a prime engine, not shown, of the vehicle. The pump 10 is fluidically connected on one side to a reservoir 11 through a conduit 12 and on the other side to an inching valve means generally designated by reference numeral 13 through a conduit 14, and fluid pressure conveyed from the reservoir 11 to the inching valve means 13 by the pump 10 is regulated by a fluid pressure control valve assembly generally designated by reference numeral 15 through a conduit 16 connected to conduit 14.

The fluid pressure control valve assembly 15 comprises a main body 17, a valve bore 18 formed in the body 17, a spool valve 19 slidably mounted within the valve bore 18, the valve 19 including lands 20 and 21 movably fitted in the bore 18, respectively, a drain chamber 22 formed between the right end wall of the land 21 and an inside wall of the body 17, and a coil spring 23 interposed within the drain chamber 22 for urging the valve 19 in the left direction as viewed in FIG. 1. The drain chamber 22 is always connected to a drain port 24. An annular chamber 25 is formed between the lands 20 and 21 about an axial rod portion of valve 19 connecting these lands and is normally communicated with an inlet port 26 of the body 17. A chamber 27 is provided between the left edge of the land 20 and an inside wall of the body 17 and is connected to the chamber 25 through an orifice 28 provided in a side passageway 29 of the body 17. The spool valve 19 is urged by the spring 23 in the left direction as viewed in FIG. 1, so that a drain port 30 formed in the body 17 is normally closed by the land 21 of the valve 19. When the pump 10 is actuated, fluid pressure is drained in the drain port 30 since the fluid pressure being admitted to the chamber 27 through the orifice 28 and passageway 29 overcomes the urging force of the spring 23, thereby regulating the fluid pressure being applied to the inching valve means 13.

Thus, regulated fluid pressure is introduced to a first inlet port 31 of the inching valve means 13 via the conduit 14. The inching valve means 13 comprises a housing 32 provided with an axial bore 33 therein, and a spool valve 34 is axially slidably mounted in the bore 33. The spool valve 34 is provided with lands 35 and 36 which are slidably fitted in the bore 33, and smaller diameter lands 37 and 38 inwardly thereof, which serve, respectively, as orifices with respect to the inside wall of the housing 32. The bore 33 is formed with a drain chamber 39 between the land 35 and the left end wall of the housing 32 which in turn is always connected with a drain port 40, and a coil spring 41 interposed within the chamber 39 urges the valve 34 in the rightward direction as viewed in FIG. 1. An annular chamber 42 is formed between the lands 35 and 36 about the lands 37 and 38 and a central rod-like portion of the valve 13 connecting these lands, which is connected to the inlet port 31 when the spool valve 34 is in communication with an outlet port 43 provided within the housing 32. A drain port 44 is normally closed by the land 35 of the spool valve 34. A chamber 45 is provided between the land 36 and an inside wall of the housing 32 and is connected to a second inlet port 46. A right end portion 47 of the valve 34 is in contact with the inner wall of the housing 32 in the rest position of the valve 34.

The reference numeral 48 generally represents a shift control valve unit mechanically connected to a shift lever, not shown. The unit 48 comprises a housing 49, a bore 50 formed in the housing 49, and a spool valve 51 axially slidably fitted in the bore 50. Lands 52, 53 and 54 are provided on the spool valve 51 for forming chambers 55, 56 and 57 within the bore 50. The chamber 55 is always communicated with a drain port 58. When the spool valve 51 is kept in its neutral position, as shown in FIG. 1, ports 59 and 60 connected, respectively, to a forward and a reverse clutch means 61 and 62 through conduits 63 and 64, are communicated, respectively, with the chambers 56 and 57, while drain ports 65 and 66 are communicated, respectively, with the chambers 56 and 57. An inlet port 67 supplied with the output pressure of pump 10 via a conduit 68 and inching valve 13 is closed by the land 53 in the neutral position of the valve 51. A shift lever 54a is mechanically connected to the valve 51 and is operable selectively at one of forward, reverse, and neutral positions.

The reference numeral 69 generally represents a tandem master cylinder comprising a cylindrical housing 70, first and second pistons 71 and 72 axially slidably fitted within the housing 70, first and second chambers 73 and 74 formed in the housing 70, and first and second springs 75 and 76 interposed in the first and second chambers 73 and 74 for urging the first and second pistons 71 and 72 respectively in the rightward direction as seen in FIG. 1. The first chamber 73 is always kept in fluid communication with an outlet port 77 provided in the housing 70 which is fluidically connected to wheel brake cylinders 78 and 79 through a conduit 80. The second chamber 74 is always kept in fluid communication with an outlet port 81 provided in the housing 70 which is fluidically connected to the second inlet port 46 of the inching valve means 13 through a conduit 82. It is to be noted that the force of the second spring 76 is smaller than that of the first spring 75.

Figure 2:
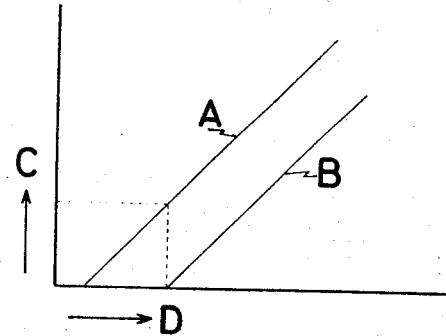
FIG. 2 is a graph diagrammatically representing the operating characteristics of the tandem master cylinder illustrated in FIG. 1.

Therefore, the fluid in the second chamber 74 of the tandem master cylinder is pressurized, as shown by A, before the fluid in the first chamber 73 is pressurized, as shown by B in FIG. 2. In FIG. 2, C shows the fluid pressure of the master cylinder 69 and D shows the stroke of a brake pedal 83. Tanks 84 and 85 are fluidically connected to the chambers 73 and 74, respectively, in the non-operating state of the brake pedal 83. One end of a rod 86 is mechanically connected to the brake pedal 83 and the other end thereof is connected to the second piston 72 of the master cylinder 69.

All of the drain ports in this transmission control system are always connected to the reservoir 11, or another tank, which is, however, omitted from the drawings for simplicity.

In operation, in the neutral position N of the shift lever 54a of the shift control valve unit 48, as shown in FIG. 1, when the operation of the engine, not shown, of the vehicle is initiated, the pump 10 discharges fluid under pressure into the chamber 42 of the inching valve means 13 via the conduit 14, the fluid pressure being controlled by the fluid pressure control valve assembly 15 through the conduit 16. Then the fluid under pressure applied to the chamber 42 is delivered to the port 67 of the shift control valve unit 48 through the conduit 68. However, the fluid pressure applied to the port 67 is being interrupted by the land 53.

When the shift lever 54a is moved to the forward position F, that is, upon the movement of the spool valve 51 to the right, the port 67 is fluidically connected to the port 59 via the chamber 56 while the fluid communication between the drain port 65 and the chamber 56 is interrupted by the land 52, and therefore, fluid under pressure is admitted to the forward clutch 61 through the conduit 63. Thus, the forward drive of the vehicle will be enabled.

When the shift lever 54a is moved to the reverse position R, that is, upon the movement of the valve 51 to the left, fluid under pressure is supplied to the reverse clutch 62 since the drain port 66 is closed by the land 54 and the port 60 is fluidically connected to the port 67, so that the reverse drive of the vehicle will be attained.

When the brake pedal 83 is depressed, for example in the forward piston of the spool valve 51, the second piston 72 of the tandem master cylinder 69 is moved through the rod 86 to the left so that the communication between the second chamber 74 and the tank 85 is cut off. The first piston 71 of the master cylinder 69 is not moved in the left direction since the force of the first spring 75 thereof is larger than that of the second spring 76, as previously mentioned. Consequently, the fluid pressure within the second chamber 74 rises before the fluid pressure within the first chamber 73 rises, as will be seen in FIG. 2. Then the rising fluid pressure within the second chamber 74 is delivered to the second inlet port 46 of the inching valve means 13 through the conduit 82, whereby the valve 34 is moved in the leftward direction as viewed in FIG. 1, against the urging force of the spring 41. Responsive to this movement of the valve 34, the fluid pressure being supplied from the pump 10 to the first inlet port 31 through the conduit 14 is decreased by the smaller diameter land 38 of the valve 34 and the fluid pressure within the annular chamber 42 is drained to the drain port 44. Also, the fluid pressure being delivered to the inlet port 67 of the shift control valve unit 48 and then to the forward clutch means 61 is decreased, and the forward clutch means 61 becomes semi-engaged.

When the pedal 83 is further depressed, in the aforementioned state, the fluid within the second chamber 74 of the tandem master cylinder 69 is further pressurized. This increased fluid pressure within the second chamber 74 is delivered to the inlet port 46 of the inching valve means 13 through the conduit 82 and the valve 34 is further moved to the left against the urging force of the spring 41. This movement of the valve 34 is accompanied by a further decrease in the fluid pressure being supplied from the pump 10 to the inlet port 31 through the conduit 14 over the smaller diameter land 38 of the valve 34, and finally the fluid pressure within the chamber 42 is fully drained to the drain port 44. Therefore, fluid pressure is not supplied to the inlet port 67 of the shift control valve unit 48 and the forward clutch means 62 is disengaged. The first spring 75 of the master cylinder 69 is not compressed until this time. When the first piston 71 is moved to the left by the fluid under pressure in the second chamber 74 and the spring 76, overcoming the biasing force of the first spring 75, the communication between the first chamber 73 and the tank 84 is cut off and the fluid within the first chamber 73 becomes pressurized. The increased fluid pressure within the first chamber 73 is delivered to the wheel cylinders 78 and 79 through the conduit 80 thereby applying the brake.

Thus even if the conduit 82 should be damaged, the brake may be fully applied since the first chamber 73 of the tandem master cylinder 69 is fluidically connected to the wheel brake cylinders 78 and 79 through the conduit 80. Accordingly, the same braking force is attained as is normally provided in the normal state of this system in accordance with the depression of the brake pedal 83.

Obviously many changes and modifications of the present invention are possible in light of the foregoing teachings. It is to be understood, therefore, that within the scope of the appended claims, the invention may be practiced otherwise than as specifically described herein.

What is claimed as new and desired to be secured by Letters Patent of the United States is:

1. A control apparatus for a vehicle having a transmission with fluid actuated clutch means and hydraulic brake means, comprising:
   a source of fluid pressure including fluid pressurizing means therefor;
   a first fluid conduit connecting said pressure source with said clutch means;
   a fluid pressure control valve assembly disposed within said first fluid conduit for automatically controlling fluid pressure being discharged from said pressure source and for delivering the controlled fluid pressure to said clutch means;
   a fluid actuated inching valve assembly disposed within said first fluid conduit for activating and de-activating said clutch means, said inching valve assembly comprising a housing provided with an axial bore therein, a spool valve axially slidably mounted in said bore and provided with first and second lands which are slidably fitted in said bore, first and second smaller diameter lands which respectively serve as variable orifices with respect to an inside wall of said housing, a first drain port disposed within said housing and closed by said first land in the rest position of said spool valve, said first and second smaller diameter lands respectively regulating said controlled fluid pressure to said first drain port and to said fluid actuated clutch means, a drain chamber in said bore between said first land and one end wall of said housing formed with a second drain, a spring interposed within said drain chamber urging said spool valve in one direction, a hydraulic pressure chamber formed between said first and second lands kept in fluid communication with said first fluid conduit in the rest position of said spool valve, a chamber formed between said second land and an inside wall of said housing, and a projection of said valve normally contacting said inside wall of said housing in the rest position of said spool valve; and
   a tandem master cylinder fluidically connected to said brake means and mechanically connected to a brake pedal, said tandem master cylinder independently including a first chamber connected to wheel brake cylinders of said brake means through a second fluid conduit and a second fluid chamber connected to the chamber between the second land and the inside wall of the housing of said inching valve assembly through a third fluid conduit, whereby even when said third fluid conduit is damaged, braking force may be obtained in accordance with the operation of the brake pedal.

2. A control apparatus as set forth in claim 1, wherein said fluid actuated clutch means comprises:
   a forward and a reverse fluid actuated clutch means, and
   a shift control valve unit being further disposed within said first fluid conduit for selectively providing said controlled fluid pressure into a pair of fluid conduits connecting an outlet port of said hydraulic pressure chamber of said inching valve assembly, respectively, to said forward and reverse clutch means.

3. A control apparatus as set forth in claim 1, wherein said fluid pressure control valve assembly comprises:
   a main body;
   a valve bore formed in said body;
   a spool valve slidably mounted within said valve bore, said valve including first and second lands movably fitted in said bore;
   a drain chamber formed between one end wall of said second land and an inside wall of said body always being connected to a drain port;
   spring means urging said valve in one direction being interposed within said drain chamber;
   an annular groove chamber formed between said first and second lands communicating with an inlet port of said body connected to said first fluid conduit between said fluid pressure source and said inching valve assembly and a drain port of said body controlled by said second land; and
   a chamber provided between one end of said first land and an inside wall of said body being connected to said annular groove chamber through a passageway having an orifice provided therein.

4. A control apparatus as set forth in claim 1, wherein said tandem master cylinder further comprises:
   a housing;
   first and second pistons axially slidably interposed within said housing;
   first and second springs disposed within said first and second fluid chambers;
   first and second outlet ports provided within said housing being constantly in fluid communication with said first and second fluid chambers, respectively; and
   two fluid supply tanks fluidically connected to said first and second fluid chambers, respectively.

5. A control apparatus as set forth in claim 4, wherein said second spring of said master cylinder is of smaller biasing force than said first spring thereof, whereby when said brake pedal is depressed to a first stage, the fluid pressure within said second chamber is pressurized and a semi-engaged clutch operation is attained through said fluid actuated inching valve assembly, and when said brake pedal is depressed to a second stage, the fluid pressure within said second chamber is further pressurized so that a fully-disengaged clutch operation is attained, and thereafter the fluid pressure within said first chamber is pressurized whereby the brake is applied.

* * * * *